United States Patent
Zarkov et al.

(10) Patent No.: US 11,645,543 B2
(45) Date of Patent: May 9, 2023

(54) SYSTEM, METHOD, AND COMPUTER PROGRAM PRODUCT FOR IMPLEMENTING A GENERATIVE ADVERSARIAL NETWORK TO DETERMINE ACTIVATIONS

(71) Applicant: Visa International Service Association, San Francisco, CA (US)

(72) Inventors: Spiridon Zarkov, Singapore (SG); Chuxin Liao, Singapore (SG); Anubhav Narang, Singapore (SG)

(73) Assignee: Visa International Service Association, San Francisco, CA (US)

( * ) Notice: Subject to any disclaimer, the term of this patent is extended or adjusted under 35 U.S.C. 154(b) by 652 days.

(21) Appl. No.: 16/776,988

(22) Filed: Jan. 30, 2020

(65) Prior Publication Data
US 2021/0241118 A1 Aug. 5, 2021

(51) Int. Cl.
*G06N 3/04* (2023.01)
*G06N 3/088* (2023.01)
(Continued)

(52) U.S. Cl.
CPC ......... *G06N 3/088* (2013.01); *G06F 16/2379* (2019.01); *G06N 3/04* (2013.01); *G06N 3/044* (2023.01); *G06Q 30/0201* (2013.01)

(58) Field of Classification Search
CPC ........ G06N 3/088; G06N 3/04; G06N 3/0445; G06N 3/0454; G06N 3/0472; G06N 3/0481; G06N 3/082; G06N 3/084; G06F 16/2379; G06Q 30/0201
See application file for complete search history.

(56) References Cited

U.S. PATENT DOCUMENTS 10,825,028 B1 * 11/2020 Kramme .............. G06Q 20/102
2016/0307096 A1 * 10/2016 Goel ...................... G06N 20/00
(Continued)

OTHER PUBLICATIONS

Gangwaretai. (WiP: Generative Adversarial Network for Oversampling Data in Credit Card Fraud Detection, published in Information Systems Security, 15th International Conference, ICISS 2019, Hyderabad, India, Dec. 16-20, 2019 Proceedings, pp. 123-133) (Year: 2019).*

(Continued)

*Primary Examiner* — Shahid K Khan
*Assistant Examiner* — Ahamed I Nazar
(74) *Attorney, Agent, or Firm* — The Webb Law Firm

(57) ABSTRACT

Provided is a computer-implemented method for generating a machine learning model to classify an account based on merchant activation, including providing an input to a generator network of a generative adversarial network (GAN) to generate an output; providing the output as input to a discriminator network; providing a training dataset as input to the discriminator network; and updating the generator network based on a first output of the discriminator network having a label that indicates whether a set of values of each of the plurality of features is a real set of values or a fake set of values. The method may include updating the discriminator network based on a second output of the discriminator network having a label that indicates whether a selected account of the plurality of accounts is going to conduct a first payment transaction. A system and computer program product are also provided.

20 Claims, 7 Drawing Sheets

(51) Int. Cl.
  G06F 16/23 (2019.01)
  G06Q 30/0201 (2023.01)
  G06N 3/044 (2023.01)

(56) References Cited

U.S. PATENT DOCUMENTS

| | | | |
|---|---|---|---|
| 2017/0262852 A1* | 9/2017 | Florimond | G06N 3/08 |
| 2020/0012917 A1* | 1/2020 | Pham | G06F 16/35 |
| 2020/0110992 A1* | 4/2020 | Hosseinzadeh | G06N 3/0472 |
| 2020/0125975 A1* | 4/2020 | Pezeshkpour | G06K 9/628 |
| 2020/0302231 A1* | 9/2020 | Nawhal | G06N 3/08 |
| 2021/0049455 A1* | 2/2021 | Kursun | G06N 3/0472 |
| 2021/0089903 A1* | 3/2021 | Murray | G06N 3/0454 |
| 2021/0192522 A1* | 6/2021 | Jameson | G06Q 40/12 |

OTHER PUBLICATIONS

Zheng et al. (Generative adversarial network based telecom fraud detection at the receiving bank, published Mar. 5, 2018, pp. 1-9) (Year: 2018).*

Sethia et al. (Data Augmentation using Generative models for Credit Card Fraud Detection, published, in the 2018 4th International Conference on Computing Communication and Automation (ICCCA), on Dec. 14-15, 2018, pp. 1-6) (Year: 2018).*

Gaurav (How to find the optimum number of hidden layers and nodes in a neural network model?, published Dec. 17, 2019, pp. 1-5) (Year: 2019).*

Joshi, "Generative adversarial networks (GANs) for synthetic dataset generation with binary classes", Data Science Campus, Feb. 21, 2019, 39 pages., accessed at https://datasciencecampus.ons.gov.uk/projects/generative-adversarial-networks-gans-for-synthetic-dataset-generation-with-binary-classes/.

Nash, "Create Data from Random Noise with Generative Adversarial Networks", 20 pages, accessed at https://www.toptal.com/machine-learning/generative-adversarial-networks.

Zheng et al., "Synthetic Dynamic PMU Data Generation: A Generative Adversarial Network Approach", Proceedings of the 2019 International Conference on Smart Grid Synchronized Measurements and Analytics (SGSMA), 2019, 6 pages.

* cited by examiner

SYSTEM, METHOD, AND COMPUTER PROGRAM PRODUCT FOR IMPLEMENTING A GENERATIVE ADVERSARIAL NETWORK TO DETERMINE ACTIVATIONS

BACKGROUND

1. Field

This disclosure relates generally to systems, devices, products, apparatus, and methods that are used for implementing a general adversarial network (GAN) and, in one particular embodiment, to a system, method, and product for implementing a hybrid deep neural network model to determine whether an individual would have an activation in a group.

2. Technical Considerations

Machine learning may be a field of computer science that uses statistical techniques to provide a computer system with the ability to learn (e.g., to progressively improve performance of) a task with data without the computer system being explicitly programmed to perform the task. In some instances, a machine learning model may be developed based on a set of data so that the machine learning model may perform a task (e.g., a task associated with a prediction) with regard to the set of data.

In some instances, a machine learning model, such as a predictive machine learning model, may be used to make a prediction regarding a risk or an opportunity based on data. A predictive machine learning model may be used to analyze a relationship between the performance of a unit based on data associated with the unit and one or more known features of the unit. The objective of the predictive machine learning model may be to assess the likelihood that a similar unit will exhibit the performance of the unit. In some instances, a predictive machine learning model may be used as a fraud detection model. For example, predictive machine learning models may perform calculations based on data associated with payment transactions to evaluate the risk or opportunity of a payment transaction involving a customer, in order to guide a decision of whether to authorize the payment transaction.

In some instances, a customer may have account activity with multiple businesses (e.g., multiple merchants). For example, an account of the customer may be involved in one or more transactions involving a customer associated with an account (e.g., a credit card account, a debit card account, and/or the like). The one or more transactions may each have similar characteristics (e.g., the one or more transactions may be associated with a price, a time at which the transaction was initiated, and/or the like). However, a financial institution and/or a merchant may be unable to accurately determine an alignment between the account and the merchant in regard to subsequent activity on (e.g., a future transaction involving) the account by a customer with that merchant. For example, the financial institution and/or the merchant may be unable to accurately determine whether the user will conduct a payment transaction that involves the merchant within a time period based on the account activity. Accordingly, the financial institution and/or the transaction service provider may transmit offers to the customer that are ineffective at encouraging the customer to conduct a payment transaction. By transmitting offers that are ineffective, network resources and/or processing resources may be wasted as compared to transmitting a smaller number of offers that are effective.

SUMMARY

Accordingly, disclosed are systems, devices, products, apparatus, and/or methods for implementing a generative adversarial network to determine a merchant activation.

According to a non-limiting aspect or embodiment, provided is a computer-implemented method for implementing a generative adversarial network to determine a merchant activation. The method may include providing, during a training procedure and, with at least one processor, an input to a generator network of a generative adversarial network (GAN); generating, with at least one processor, an output of the generator network based on the input, wherein the output comprises a generated dataset, wherein the generated dataset comprises a first plurality of sets of values for each of a plurality of features and the first plurality of sets of values for each of the plurality of features comprises data associated with a first plurality of payment transactions conducted using a plurality of accounts and involving a plurality of merchants; providing, during the training procedure and with at least one processor, the output of the generator network as an input to a discriminator network of the GAN; providing, during the training procedure and with at least one processor, a training dataset as an input to the discriminator network of the GAN, wherein the training dataset comprises a second plurality of sets of values for each of the plurality of features and the second plurality of sets of values for each of the plurality of features comprises data associated with a second plurality of payment transactions conducted using the plurality of accounts and involving the plurality of merchants; updating, during the training procedure and with at least one processor, the generator network of the GAN based on a first output of the discriminator network of the GAN having a label that indicates whether a set of values of each of the plurality of features is real set of values or a fake set of values; and updating, during the training procedure and with at least one processor, the discriminator network of the GAN based on a second output of the discriminator network of the GAN having a label that indicates whether a selected account of the plurality of accounts is going to conduct a first payment transaction with a selected merchant of the plurality of merchants.

According to a non-limiting aspect or embodiment, provided is a system for implementing a generative adversarial network to determine a merchant activation. The system may include at least one processor programmed or configured to: provide, during a training procedure, an input to a generator network of a generative adversarial network (GAN), wherein the generator network includes: a first dense layer comprising a rectified linear unit (ReLu) function with 16 nodes; a second dense layer comprising a ReLu function with 32 nodes, wherein the second dense layer is fully connected to the first dense layer; a third dense layer comprising a ReLu function with 64 nodes, wherein the third dense layer is fully connected to the second dense layer; a fourth dense layer comprising a ReLu function with 128 nodes, wherein the fourth dense layer is fully connected to the third dense layer; a fifth dense layer comprising a ReLu function with 182 nodes, wherein the fifth dense layer is fully connected to the fourth dense layer; generate an output of the generator network based on the input, wherein the output comprises a generated dataset, wherein the generated dataset comprises a first plurality of sets of values for each of a plurality of features and the first plurality of sets of values for each of the plurality of features comprises data associated with a first plurality of payment transactions conducted using a plurality of accounts and involving a plurality of merchants; provide, during the training procedure, the output of the generator network as an input to a discriminator network of the GAN; provide, during the training procedure, a training dataset as an input to the discriminator network of the GAN, wherein the training dataset comprises a second plurality of sets of values for each of the plurality of features and the second plurality of sets of values for each of the plurality of features comprises data associated with a second plurality of payment transactions conducted using the plurality of accounts and involving the plurality of merchants; update, during the training procedure, the generator network of the GAN based on a first output of the discriminator network of the GAN having a label that indicates whether a set of values of each of the plurality of features is real set of values or a fake set of values; and update, during the training procedure, the discriminator network of the GAN based on a second output of the discriminator network of the GAN having a label that indicates whether a selected account of the plurality of accounts is going to conduct a first payment transaction with a selected merchant of the plurality of merchants.

According to a non-limiting aspect or embodiment, provided is a computer program product for implementing a generative adversarial network to determine a merchant activation. In some non-limiting embodiments, the computer program product may comprise at least one non-transitory computer-readable medium including one or more instructions that, when executed by at least one processor, cause the at least one processor to: provide, during a training procedure, an input to a generator network of a generative adversarial network (GAN), wherein the generator network includes: a first dense layer comprising a rectified linear unit (ReLu) function with 16 nodes; a second dense layer comprising a ReLu function with 32 nodes, wherein the second dense layer is fully connected to the first dense layer; a third dense layer comprising a ReLu function with 64 nodes, wherein the third dense layer is fully connected to the second dense layer; a fourth dense layer comprising a ReLu function with 128 nodes, wherein the fourth dense layer is fully connected to the third dense layer; a fifth dense layer comprising a ReLu function with 182 nodes, wherein the fifth dense layer is fully connected to the fourth dense layer; during the training procedure, implement a dropout of 30% at each of the first dense layer, the second dense layer, the third dense layer, the fourth dense layer, and the fifth dense layer of the generator network of the GAN; and during the training procedure, implement a batch normalization process at each of the first dense layer, the second dense layer, the third dense layer, the fourth dense layer, and the fifth dense layer of the generator network of the GAN; generate an output of the generator network based on the input, wherein the output comprises a generated dataset, wherein the generated dataset comprises a first plurality of sets of values for each of a plurality of features and the first plurality of sets of values for each of the plurality of features comprises data associated with a first plurality of payment transactions conducted using a plurality of accounts and involving a plurality of merchants; provide, during the training procedure, the output of the generator network as an input to a discriminator network of the GAN; provide, during the training procedure, a training dataset as an input to the discriminator network of the GAN, wherein the training dataset comprises a second plurality of sets of values for each of the plurality of features and the second plurality of sets of values for each of the plurality of features comprises data associated with a second plurality of payment transactions conducted using the plurality of accounts and involving the plurality of merchants; update, during the training procedure, the generator network of the GAN based on a first output of the discriminator network of the GAN having a label that indicates whether a set of values of each of the plurality of features is real set of values or a fake set of values; and update, during the training procedure, the discriminator network of the GAN based on a second output of the discriminator network of the GAN having a label that indicates whether a selected account of the plurality of accounts is going to conduct a first payment transaction with a selected merchant of the plurality of merchants.

Further embodiments or aspects are set forth in the following numbered clauses:

Clause 1: A computer-implemented method for generating a machine learning model to classify an account based on merchant activation comprising: providing, during a training procedure and with at least one processor, an input to a generator network of a generative adversarial network (GAN); generating, with at least one processor, an output of the generator network based on the input, wherein the output comprises a generated dataset, wherein the generated dataset comprises a first plurality of sets of values for each of a plurality of features and the first plurality of sets of values for each of the plurality of features comprises data associated with a first plurality of payment transactions conducted using a plurality of accounts and involving a plurality of merchants; providing, during the training procedure and with at least one processor, the output of the generator network as an input to a discriminator network of the GAN; providing, during the training procedure and with at least one processor, a training dataset as an input to the discriminator network of the GAN, wherein the training dataset comprises a second plurality of sets of values for each of the plurality of features and the second plurality of sets of values for each of the plurality of features comprises data associated with a second plurality of payment transactions conducted using the plurality of accounts and involving the plurality of merchants; updating, during the training procedure and with at least one processor, the generator network of the GAN based on a first output of the discriminator network of the GAN having a label that indicates whether a set of values of each of the plurality of features is a real set of values or a fake set of values; and updating, during the training procedure and with at least one processor, the discriminator network of the GAN based on a second output of the discriminator network of the GAN having a label that indicates whether a selected account of the plurality of accounts is going to conduct a first payment transaction with a selected merchant of the plurality of merchants.

Clause 2: The computer-implemented method of clause 1, wherein the generator network of the GAN comprises: a first dense layer comprising a ReLu function with 16 nodes; a second dense layer comprising a ReLu function with 32 nodes, wherein the second dense layer is fully connected to the first dense layer; a third dense layer comprising a ReLu function with 64 nodes, wherein the third dense layer is fully connected to the second dense layer; a fourth dense layer comprising a ReLu function with 128 nodes, wherein the fourth dense layer is fully connected to the third dense layer; and a fifth dense layer comprising a ReLu function with 182 nodes, wherein the fifth dense layer is fully connected to the fourth dense layer.

Clause 3: The computer-implemented method of clauses 1 or 2, further comprising: during the training procedure, implementing a dropout of 30% at each of the first dense layer, the second dense layer, the third dense layer, the fourth dense layer, and the fifth dense layer of the generator network of the GAN; and during the training procedure, implementing a batch normalization process at each of the first dense layer, the second dense layer, the third dense layer, the fourth dense layer, and the fifth dense layer of the generator network of the GAN.

Clause 4: The computer-implemented method of any of clauses 1-3, wherein the discriminator network of the GAN comprises: a first dense layer comprising a ReLu function with 128 nodes; a second dense layer comprising a ReLu function with 64 nodes, wherein the second dense layer is fully connected to the first dense layer; a third dense layer comprising a ReLu function with 32 nodes, wherein the third dense layer is fully connected to the second dense layer; a fourth dense layer comprising a ReLu function with 16 nodes, wherein the fourth dense layer is fully connected to the third dense layer; a fifth dense layer comprising a sigmoid function with 1 node, wherein the fifth dense layer is fully connected to the fourth dense layer; and a sixth dense layer comprising a sigmoid function with 1 node, wherein the sixth dense layer is fully connected to the fourth dense layer.

Clause 5: The computer-implemented method of any of clauses 1-4, further comprising: during the training procedure, implementing a dropout of 30% at each of the first dense layer, the second dense layer, the third dense layer, and the fourth dense layer of the discriminator network of the GAN; and during the training procedure, implementing a batch normalization process at each of the first dense layer, the second dense layer, the third dense layer, and the fourth dense layer of the discriminator network of the GAN.

Clause 6: The computer-implemented method of any of clauses 1-5, further comprising: providing an input to the discriminator network of the GAN and obtaining an output that indicates whether an account is going to conduct a first payment transaction with a merchant of the plurality of merchants.

Clause 7: The computer-implemented method of any of clauses 1-6, wherein providing, during the training procedure, the input to the generator network of the GAN comprises: providing randomly generated data as an input to an XGBoost machine learning model and a Neural Collaborative Filtering machine learning model; and providing an output of the XGBoost machine learning model and the Neural Collaborative Filtering machine learning model as the input to the generator network of the GAN.

Clause 8: The computer-implemented method of any of clauses 1-7, further comprising: during the training procedure, optimizing the discriminator network of the GAN based on a formula, wherein the formula includes a value of Recall for the discriminator network and the formula is defined as: Recall=TP/(TP+FN); wherein TP is a number of true positive predictions based on an output of the discriminator network corresponding to a ground truth label of a set of values of a plurality of features; and wherein FN is a number of false negative predictions based on an output of the discriminator network not corresponding to a ground truth label of a set of values of a plurality of features.

Clause 9: A system for generating a machine learning model to classify an account based on merchant activation, comprising: at least one processor programmed or configured to: provide, during a training procedure, an input to a generator network of a generative adversarial network (GAN), wherein the generator network comprises: a first dense layer comprising a rectified linear unit (ReLu) function with 16 nodes; a second dense layer comprising a ReLu function with 32 nodes, wherein the second dense layer is fully connected to the first dense layer; a third dense layer comprising a ReLu function with 64 nodes, wherein the third dense layer is fully connected to the second dense layer; a fourth dense layer comprising a ReLu function with 128 nodes, wherein the fourth dense layer is fully connected to the third dense layer; and a fifth dense layer comprising a ReLu function with 182 nodes, wherein the fifth dense layer is fully connected to the fourth dense layer; generate an output of the generator network based on the input, wherein the output comprises a generated dataset, wherein the generated dataset comprises a first plurality of sets of values for each of a plurality of features and the first plurality of sets of values for each of the plurality of features comprises data associated with a first plurality of payment transactions conducted using a plurality of accounts and involving a plurality of merchants; provide, during the training procedure, the output of the generator network as an input to a discriminator network of the GAN; provide, during the training procedure, a training dataset as an input to the discriminator network of the GAN, wherein the training dataset comprises a second plurality of sets of values for each of the plurality of features and the second plurality of sets of values for each of the plurality of features comprises data associated with a second plurality of payment transactions conducted using the plurality of accounts and involving the plurality of merchants; update, during the training procedure, the generator network of the GAN based on a first output of the discriminator network of the GAN having a label that indicates whether a set of values of each of the plurality of features is a real set of values or a fake set of values; and update, during the training procedure, the discriminator network of the GAN based on a second output of the discriminator network of the GAN having a label that indicates whether a selected account of the plurality of accounts is going to conduct a first payment transaction with a selected merchant of the plurality of merchants.

Clause 10: The system of clause 9, wherein the at least one processor is further programmed or configured to: during the training procedure, implement a dropout of 30% at each of the first dense layer, the second dense layer, the third dense layer, the fourth dense layer, and the fifth dense layer of the generator network of the GAN; and during the training procedure, implement a batch normalization process at each of the first dense layer, the second dense layer, the third dense layer, the fourth dense layer, and the fifth dense layer of the generator network of the GAN.

Clause 11: The system of clauses 9 or 10, wherein the discriminator network of the GAN comprises: a first dense layer comprising a ReLu function with 128 nodes; a second dense layer comprising a ReLu function with 64 nodes, wherein the second dense layer is fully connected to the first dense layer; a third dense layer comprising a ReLu function with 32 nodes, wherein the third dense layer is fully connected to the second dense layer; a fourth dense layer comprising a ReLu function with 16 nodes, wherein the fourth dense layer is fully connected to the third dense layer; a fifth dense layer comprising a sigmoid function with 1 node, wherein the fifth dense layer is fully connected to the fourth dense layer; and a sixth dense layer comprising a sigmoid function with 1 node, wherein the sixth dense layer is fully connected to the fourth dense layer.

Clause 12: The system of any of clauses 9-11, wherein the at least one processor is programmed or configured to:

during the training procedure, implement a dropout of 30% at each of the first dense layer, the second dense layer, the third dense layer, and the fourth dense layer of the discriminator network of the GAN; and during the training procedure, implement a batch normalization process at each of the first dense layer, the second dense layer, the third dense layer, and the fourth dense layer of the discriminator network of the GAN.

Clause 13: The system of any of clauses 9-12, wherein the at least one processor is further programmed or configured to: provide an input to the discriminator network of the GAN and obtain an output that indicates whether an account is going to conduct a first payment transaction with a merchant of the plurality of merchants.

Clause 14: The system of any of clauses 9-13, wherein when providing, during the training procedure, the input to the generator network of the GAN, the at least one processor is programmed or configured to: provide randomly generated data as an input to an XGBoost machine learning model and a Neural Collaborative Filtering machine learning model; and provide an output of the XGBoost machine learning model and the Neural Collaborative Filtering machine learning model as the input to the generator network of the GAN.

Clause 15: The system of any of clauses 9-14, wherein the at least one processor is further programmed or configured to: during the training procedure, optimize the discriminator network of the GAN based on a formula, wherein the formula includes a value of Recall for the discriminator network and the formula is defined as: Recall=TP/(TP+FN); wherein TP is a number of true positive predictions based on an output of the discriminator network corresponding to a ground truth label of a set of values of a plurality of features; and wherein FN is a number of false negative predictions based on an output of the discriminator network not corresponding to a ground truth label of a set of values of a plurality of features. Clause 16: A computer program product for generating a machine learning model to classify an account based on merchant activation comprising at least one non-transitory computer-readable medium including one or more instructions that, when executed by at least one processor, cause the at least one processor to: provide, during a training procedure, an input to a generator network of a generative adversarial network (GAN), wherein the generator network comprises: a first dense layer comprising a rectified linear unit (ReLu) function with 16 nodes; a second dense layer comprising a ReLu function with 32 nodes, wherein the second dense layer is fully connected to the first dense layer; a third dense layer comprising a ReLu function with 64 nodes, wherein the third dense layer is fully connected to the second dense layer; a fourth dense layer comprising a ReLu function with 128 nodes, wherein the fourth dense layer is fully connected to the third dense layer; and a fifth dense layer comprising a ReLu function with 182 nodes, wherein the fifth dense layer is fully connected to the fourth dense layer; during the training procedure, implement a dropout of 30% at each of the first dense layer, the second dense layer, the third dense layer, the fourth dense layer, and the fifth dense layer of the generator network of the GAN; and during the training procedure, implement a batch normalization process at each of the first dense layer, the second dense layer, the third dense layer, the fourth dense layer, and the fifth dense layer of the generator network of the GAN; generate an output of the generator network based on the input, wherein the output comprises a generated dataset, wherein the generated dataset comprises a first plurality of sets of values for each of a plurality of features and the first plurality of sets of values for each of the plurality of features comprises data associated with a first plurality of payment transactions conducted using a plurality of accounts and involving a plurality of merchants; provide, during the training procedure, the output of the generator network as an input to a discriminator network of the GAN; provide, during the training procedure, a training dataset as an input to the discriminator network of the GAN, wherein the training dataset comprises a second plurality of sets of values for each of the plurality of features and the second plurality of sets of values for each of the plurality of features comprises data associated with a second plurality of payment transactions conducted using the plurality of accounts and involving the plurality of merchants; update, during the training procedure, the generator network of the GAN based on a first output of the discriminator network of the GAN having a label that indicates whether a set of values of each of the plurality of features is real set of values or a fake set of values; and update, during the training procedure, the discriminator network of the GAN based on a second output of the discriminator network of the GAN having a label that indicates whether a selected account of the plurality of accounts is going to conduct a first payment transaction with a selected merchant of the plurality of merchants.

Clause 17: The computer program product of clause 16, wherein the discriminator network of the GAN comprises: a first dense layer comprising a ReLu function with 128 nodes; a second dense layer comprising a ReLu function with 64 nodes, wherein the second dense layer is fully connected to the first dense layer; a third dense layer comprising a ReLu function with 32 nodes, wherein the third dense layer is fully connected to the second dense layer; a fourth dense layer comprising a ReLu function with 16 nodes, wherein the fourth dense layer is fully connected to the third dense layer; a fifth dense layer comprising a sigmoid function with 1 node, wherein the fifth dense layer is fully connected to the fourth dense layer; and a sixth dense layer comprising a sigmoid function with 1 node, wherein the sixth dense layer is fully connected to the fourth dense layer.

Clause 18: The computer program product of clauses 16 or 17, wherein the one or more instructions further cause the at least one processor to: during the training procedure, implement a dropout of 30% at each of the first dense layer, the second dense layer, the third dense layer, and the fourth dense layer of the discriminator network of the GAN; and during the training procedure, implement a batch normalization process at each of the first dense layer, the second dense layer, the third dense layer, and the fourth dense layer of the discriminator network of the GAN.

Clause 19: The computer program product of any of clauses 16-18, wherein the one or more instructions further cause the at least one processor to: provide an input to the discriminator network of the GAN and obtain an output that indicates whether an account is going to conduct a first payment transaction with a merchant of the plurality of merchants.

Clause 20: The computer program product of any of clauses 16-19, wherein one or more instructions further cause the at least one processor to: during the training procedure, optimize the discriminator network of the GAN based on a formula, wherein the formula includes a value of Recall for the discriminator network and the formula is defined as: Recall=TP/(TP+FN); wherein TP is a number of true positive predictions based on an output of the discriminator network corresponding to a ground truth label of a set of values of a plurality of features; and wherein FN is a number of false negative predictions based on an output of the discriminator network not corresponding to a ground truth label of a set of values of a plurality of features.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of non-limiting embodiments or aspects are explained in greater detail below with reference to the exemplary embodiments that are illustrated in the accompanying schematic figures, in which.

DESCRIPTION

Figure 1:
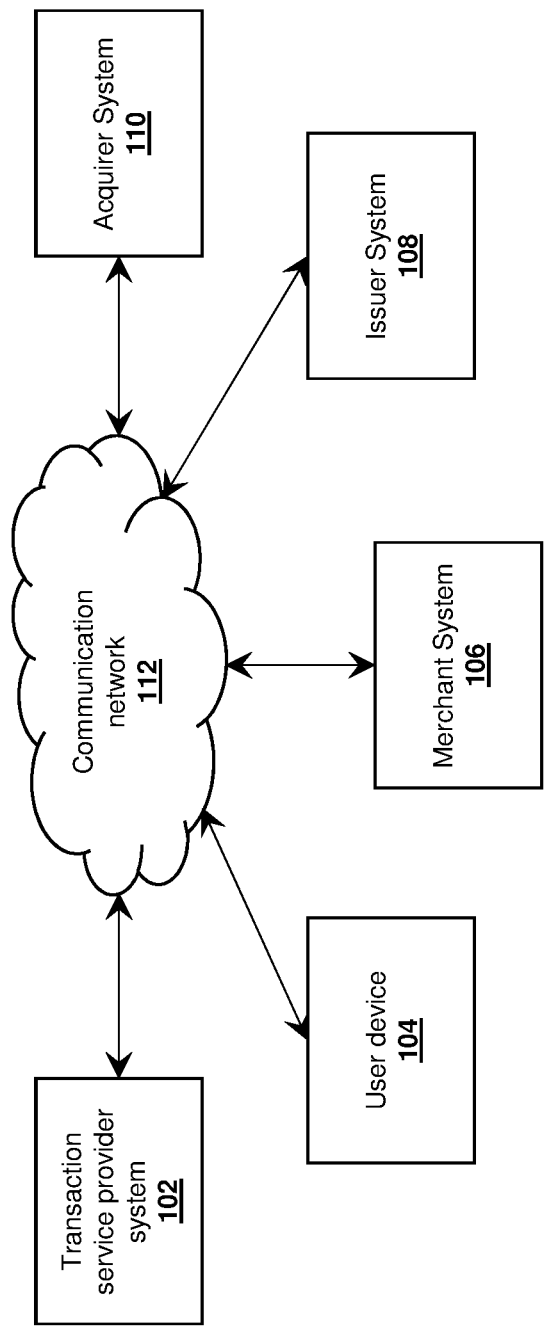
FIG. 1 is a diagram of a non-limiting embodiment of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a message may refer to a network packet (e.g., a data packet and/or the like) that includes data.

As used herein, the terms "issuer," "issuer institution," "issuer bank," or "payment device issuer" may refer to one or more entities that provide accounts to individuals (e.g., users, customers, and/or the like) for conducting payment transactions such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a consumer, a customer of a merchant, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices, which may be used by a merchant to conduct a transaction (e.g., a payment transaction) and/or process a transaction. Additionally or alternatively, a POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments, a transaction service provider may include a credit card company, a debit card company, a payment network such as Visa®, Master-Card®, AmericanExpress®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "payment device" may refer to a payment card (e.g., a credit or debit card), a gift card, a smart card (e.g., a chip card, an integrated circuit card, and/or the like), smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices that are configured to directly or indirectly communicate with or over one or more networks. In some non-limiting embodiments, a computing device may include a mobile device. A mobile device may include a smartphone, a portable computer, a wearable device (e.g., watches, glasses, lenses, clothing, and/or the like), a personal digital assistant (PDA), and/or other like devices. In some non-limiting embodiments, a computing device may include a server, a desktop computer, and/or the like.

As used herein, the terms "client" and "client device" may refer to one or more computing devices, such as processors, storage devices, and/or similar computer components, that access a service made available by a server. In some non-limiting embodiments, a "client device" may refer to one or more devices that facilitate payment transactions, such as one or more POS devices used by a merchant. In some non-limiting embodiments, a client device may include a computing device configured to communicate with one or more networks and/or facilitate payment transactions such as, but not limited to, one or more desktop computers, one or more mobile devices, and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or clients.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In some non-limiting embodiments, computer-implemented systems, methods, and computer program products for generating a machine learning model to classify an account based on merchant activation are disclosed. For example, a computer-implemented method may include providing, during a training procedure and with at least one processor, an input to a generator network of a generative adversarial network (GAN); generating, with at least one processor, an output of the generator network based on the input, wherein the output comprises a generated dataset, wherein the generated dataset comprises a first plurality of sets of values for each of a plurality of features and the first plurality of sets of values for each of the plurality of features comprises data associated with a first plurality of payment transactions conducted using a plurality of accounts and involving a plurality of merchants; providing, during the training procedure and with at least one processor, the output of the generator network as an input to a discriminator network of the GAN; providing, during the training procedure and with at least one processor, a training dataset as an input to the discriminator network of the GAN, wherein the training dataset comprises a second plurality of sets of values for each of the plurality of features and the second plurality of sets of values for each of the plurality of features comprises data associated with a second plurality of payment transactions conducted using the plurality of accounts and involving the plurality of merchants; updating, during the training procedure and with at least one processor, the generator network of the GAN based on a first output of the discriminator network of the GAN having a label that indicates whether a set of values of each of the plurality of features is a real set of values or a fake set of values; and updating, during the training procedure and with at least one processor, the discriminator network of the GAN based on a second output of the discriminator network of the GAN having a label that indicates whether a selected account of the plurality of accounts is going to conduct a first payment transaction with a selected merchant of the plurality of merchants.

In this way, non-limiting embodiments of the present disclosure may accurately determine an alignment between an account and a merchant in regard to subsequent activity on (e.g., future transactions) the account by a customer with that merchant. For example, financial institutions and/or merchants may be able to accurately determine whether a user will conduct a payment transaction that involves the financial institutions and/or merchants within a time period based on the account activity. Accordingly, the financial institutions and/or the merchants may transmit offers to customers that are effective at encouraging the customers to conduct a payment transaction. Additionally, or alternatively, the financial institutions and/or the transaction service providers may forego transmitting offers to customers that would be ineffective at encouraging the customers to conduct the payment transaction. By transmitting offers that are effective, network resources and/or processing resources may be conserved as compared to transmitting a larger number of offers that include offers to customers that would be ineffective at encouraging the customers to conduct payment transactions. Further, financial institutions and/or merchants may forego processing fraudulent payment transactions (e.g., merchant systems may forego transmitting transaction data associated with payment transactions to transaction service provider systems, financial institutions may forego authorizing payment transactions, and/or the like). For example, a selected merchant and/or financial institution associated with the selected merchant may determine to forego permitting a payment transaction to be processed based on determining that an account involved in the payment transaction was not selected from a plurality of accounts to conduct a first payment transaction with the selected merchant. As a result, network resources and/or processing resources may be conserved.

Referring now to FIG. 1, FIG. 1 is a diagram of an example environment 100 in which devices, systems, methods, and/or products described herein may be implemented. As shown in FIG. 1, environment 100 includes transaction service provider system 102, user device 104, merchant system 106, issuer system 108, and acquirer system 110. In some non-limiting embodiments, transaction service provider system 102, user device 104, merchant system 106, issuer system 108, and acquirer system 110 may interconnect (e.g., establish a connection to communicate and/or the like) via wired connections, wireless connections, or a combination of wired and wireless connections.

Transaction service provider system 102 may include one or more devices capable of being in communication with user device 104, merchant system 106, issuer system 108, and/or acquirer system 110 via communication network 112. For example, transaction service provider system 102 may include a server (e.g., a transaction processing server), a group of servers (e.g., a group of transaction processing servers), and/or other like devices. In some non-limiting embodiments, transaction service provider system 102 may be associated with a transaction service provider, as described herein.

User device 104 may include one or more devices capable of being in communication with transaction service provider system 102, merchant system 106, issuer system 108, and/or acquirer system 110 via communication network 112. For example, user device 104 may include one or more computing devices, such as one or more mobile devices, one or more smartphones, one or more wearable devices, one or more servers, and/or the like. In some non-limiting embodiments, user device 104 may communicate via a short-range wireless communication connection. In some non-limiting embodiments, user device 104 may be associated with a customer, as described herein.

Merchant system 106 may include one or more devices capable of being in communication with transaction service provider system 102, acquirer system 110, issuer system 108, and user device 104 via communication network 112. For example, merchant system 106 may include one or more payment devices, one or more computing devices, such as one or more mobile devices, one or more smartphones, one or more wearable devices (e.g., watches, glasses, lenses, clothing, and/or the like), one or more PDAs, one or more servers, and/or the like. In some non-limiting embodiments, merchant system 106 may communicate via a short-range wireless communication connection (e.g., a wireless communication connection for communicating information in a range between 2 to 3 centimeters to 5 to 6 meters, such as an NFC communication connection, an RFID communication connection, a Bluetooth® communication connection, and/or the like). In some non-limiting embodiments, merchant system 106 may be associated with a merchant, as described herein.

Issuer system 108 may include one or more devices capable of being in communication with merchant system 106, transaction service provider system 102, acquirer system 110, and/or user device 104 via communication network 112. For example, issuer system 108 may include one or more computing devices, such one or more servers and/or other like devices. In some non-limiting embodiments, issuer system 108 may be associated with an issuer institution that issued a payment account and/or instrument (e.g., a credit account, a debit account, a credit card, a debit card, and/or the like) to a customer.

Acquirer system 110 may include one or more devices capable of being in communication with merchant system 106, transaction service provider system 102, issuer system 108, and/or user device 104 via communication network 112. For example, acquirer system 110 may include one or more computing devices, such as one or more servers and/or other like devices. In some non-limiting embodiments, acquirer system 110 may be associated with an acquirer, as described herein.

Communication network 112 may include one or more wired and/or wireless networks. For example, communication network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
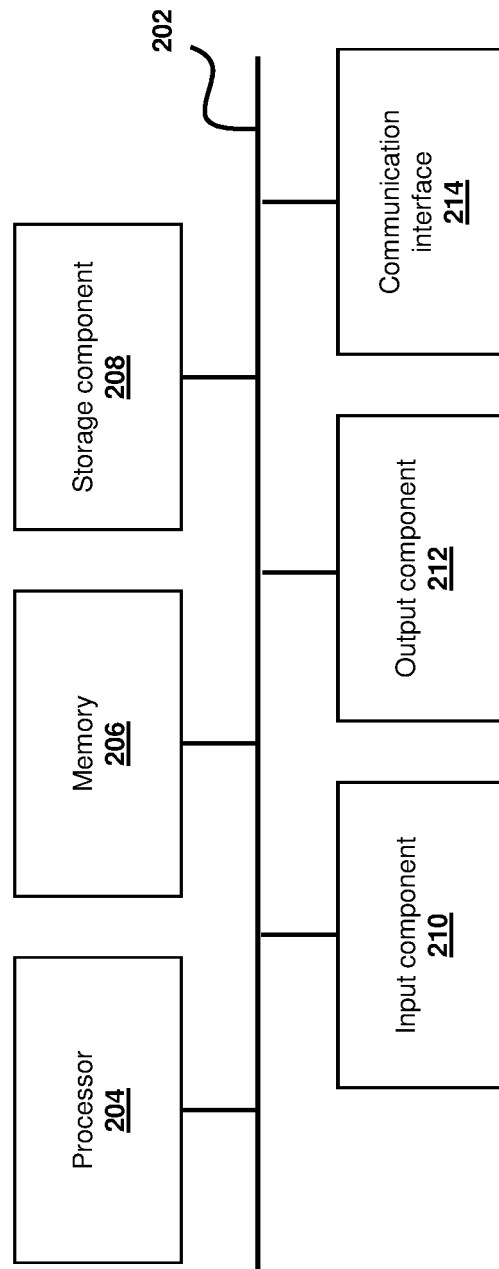
FIG. 2 is a diagram of a non-limiting aspect or embodiment of components of one or more devices and/or one or more systems of FIG. 1.

Referring now to FIG. 2, FIG. 2 is a diagram of example components of device 200. Device 200 may correspond to one or more devices of transaction service provider system 102, one or more devices of merchant system 106 (e.g., one or more devices of a device of merchant system 106), one or more devices of acquirer system 110, one or more devices of issuer system 108, and/or one or more devices of user device 104. In some non-limiting aspects or embodiments, one or more devices of transaction service provider system 102, one or more devices of merchant system 106, one or more devices of acquirer system 110, one or more devices of issuer system 108, and/or one or more devices of user device 104 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting aspects or embodiments, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of retrieving information from, storing information in, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting aspects or embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
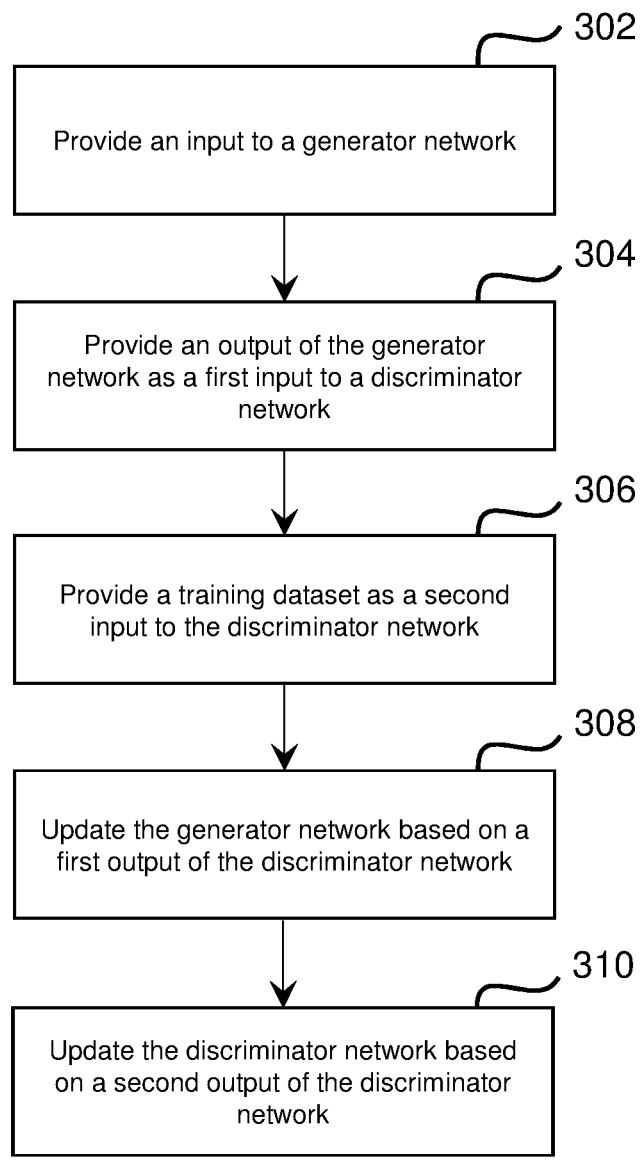
FIG. 3 is a flowchart of a non-limiting embodiment of a process for implementing a generative adversarial network (GAN) to determine a merchant activation.

Referring now to FIG. 3, FIG. 3 is a flowchart of a non-limiting embodiment of a process 300 for implementing a generative adversarial network to determine a merchant activation. In some non-limiting aspects or embodiments, one or more of the functions described with respect to process 300 may be performed (e.g., completely, partially, and/or the like) by transaction service provider system 102. In some non-limiting embodiments, one or more of the steps of process 300 may be performed (e.g., completely, partially, and/or the like) by another device or a group of devices separate from and/or including transaction service provider system 102 such as, for example, user device 104, merchant system 106, issuer system 108, and/or acquirer system 110.

As shown in FIG. 3, at step 302, process 300 may include providing an input to a generator network. For example, transaction service provider system 102 may provide an input to a generator network of a generative adversarial network (GAN). In some non-limiting embodiments, such input may be provided (e.g., by transaction service provider system 102) to the generator network during a training procedure.

In some non-limiting embodiments, transaction service provider system 102 may generate random noise data. For example, transaction service provider system 102 may generate random noise data that includes a least one random vector (e.g., at least one random noise vector). In some non-limiting embodiments, a random vector may include a vector of randomly generated features (e.g., randomly generated values, such as numerical values, categorical values, and/or the like). In some non-limiting embodiments, the input may be based on at least one random vector. For example, transaction service provider system 102 may provide a random vector as the input to the generator network. In some non-limiting embodiments, the generator network may include a plurality of input nodes including a respective input node for each respective feature of a random vector. Additionally or alternatively, transaction service provider system 102 may provide each respective feature of the random vector to a respective input node of the generator network.

In some non-limiting embodiments, randomly generated data (e.g., the random vector and/or the like) may be provided (e.g., by transaction service provider system 102) as input to at least one machine learning model. For example, the at least one machine learning model may include a gradient boosting machine learning model (e.g., Extreme Gradient Boosting (XGBoost) model and/or the like), a collaborative filtering model (e.g., Neural Collaborative Filtering (NCF) model and/or the like), any combination thereof, and/or the like. For the purpose of illustration, transaction service provider system 102 may provide the randomly generated data (e.g., the random vector and/or the like) as an input to an XGBoost machine learning model and an NCF machine learning model. In some non-limiting embodiments, an output of the machine learning model(s) may be provided (e.g., by transaction service provider system 102) as input to the generator network. For example, the output of at least one of a gradient boosting machine learning model (e.g., XGBoost model and/or the like), a neural collaborative filtering (NCF) model, or any combination thereof, may be provided as input to the generator network. For the purpose of illustration, transaction service provider system 102 may provide the output of the XGBoost machine learning model and an NCF machine learning model as the input to the generator network.

In some non-limiting embodiments, an output of the generator network may be generated. For example, transaction service provider system 102 may generate an output of the generator network based on the input (e.g., at least one random vector). In some non-limiting embodiments, the output may include a generated dataset that includes a plurality of feature vectors. The generated dataset may include a first plurality of sets of values for each of a plurality of features (e.g., features of account data and/or the like) of each feature vector of the plurality of feature vectors. As an example, the first plurality of sets of values for each of the plurality of features may include account data associated with a first account of a plurality accounts, where the first account conducted a plurality of payment transactions involving a plurality of merchants. In some non-limiting embodiments, each feature vector of a plurality of feature vectors that make up the generated dataset may include the plurality of features. In some non-limiting embodiments, the plurality of features may include a feature associated with a country of the customer, a feature associated with a time interval (e.g., a date, a time of day, and/or the like) of a payment transaction, a feature associated with a merchant category code (MCC) of a merchant involved in a payment transaction, a feature associated with a country code of a merchant involved in a payment transaction, a feature associated with an identifier of a merchant (e.g., a merchant dba identifier), a feature associated with the merchant group code of a merchant involved in a payment transaction, a feature associated with a market segment of a merchant involved in a payment transaction, a feature associated with a transaction amount (e.g., in U.S. dollars) of a payment transaction, a feature associated with a channel of commerce (e.g., an e-commerce channel, an in-person commerce channel, and/or the like) of a payment transaction, a feature associated with an indicator of whether a payment transaction is a domestic transaction or an international transaction, a feature associated with a total amount of a plurality of payment transactions conducted within a time interval, a feature associated with a total amount of a plurality of card-present payment transactions conducted within a time interval, and/or the like.

In some non-limiting embodiments, the plurality of features of the generated dataset may include a first number of features (e.g., the same number of features as real account data, the same number of features as a training dataset, and/or the like). Additionally or alternatively, each random vector may include a second number of features less than or equal to the first number of features. In some non-limiting embodiments, the generator network may include an input node for each feature of the second number of features (e.g., each feature of a random vector). Additionally or alternatively, the generator network may include an output node for each feature of the first number of features (e.g., each feature of a feature vector included in the generated dataset).

In some non-limiting embodiments, the generator network may include a plurality of dense layers. In some non-limiting embodiments, the generator network may include a first dense layer comprising a plurality of nodes (e.g., an input layer comprising a plurality of input nodes). For example, the first dense layer (e.g., input layer) may include 16 nodes (e.g., $2^4$ nodes). Additionally or alternatively, each node may include an activation function (e.g., rectified linear unit (ReLU) function, sigmoid function, hyperbolic tangent function, and/or the like). For example, each node may have a ReLU function as the activation function thereof.

In some non-limiting embodiments, the generator network may include a second dense layer comprising a plurality of nodes (e.g., a first hidden layer comprising a plurality of nodes). For example, the second dense layer (e.g., first hidden layer) may include 32 nodes (e.g., $2^5$ nodes). Additionally or alternatively, each node may include an activation function (e.g., ReLU function, sigmoid function, hyperbolic tangent function, and/or the like). For example, each node may have a ReLU function as the activation function thereof. In some non-limiting embodiments, the second dense layer may be fully connected to the first dense layer.

In some non-limiting embodiments, the generator network may include a third dense layer comprising a plurality of nodes (e.g., a second hidden layer comprising a plurality of nodes). For example, the third dense layer (e.g., second hidden layer) may include 64 nodes (e.g., $2^6$ nodes). Additionally or alternatively, each node may include an activation function (e.g., ReLU function, sigmoid function, hyperbolic tangent function, and/or the like). For example, each node may have a ReLU function as the activation function thereof. In some non-limiting embodiments, the third dense layer may be fully connected to the second dense layer.

In some non-limiting embodiments, the generator network may include a fourth dense layer comprising a plurality of nodes (e.g., a third hidden layer comprising a plurality of nodes). For example, the fourth dense layer (e.g., third hidden layer) may include 128 nodes (e.g., $2^7$ nodes). Additionally or alternatively, each node may include an activation function (e.g., ReLU function, sigmoid function, hyperbolic tangent function, and/or the like). For example, each node may have a ReLU function as the activation function thereof. In some non-limiting embodiments, the fourth dense layer may be fully connected to the third dense layer.

In some non-limiting embodiments, the generator network may include a fifth dense layer comprising a plurality of nodes (e.g., an output layer comprising a plurality of output nodes). For example, the fifth dense layer (e.g., output layer) may include 182 nodes (e.g., corresponding to the first number of features, the same number of features of real account data, and/or the like). Additionally or alternatively, each node may include an activation function (e.g., ReLU function, sigmoid function, hyperbolic tangent function, and/or the like). For example, each node may have a ReLU function as the activation function thereof. In some non-limiting embodiments, the fifth dense layer may be fully connected to the fourth dense layer.

As shown in FIG. 3, at step 304, process 300 may include providing a first input to a discriminator network. For example, transaction service provider system 102 may provide an output of the generator network as a first input to a discriminator network of the GAN. In some non-limiting embodiments, such (first) input may be provided (e.g., by transaction service provider system 102) to the discriminator network during a training procedure.

In some non-limiting embodiments, the discriminator network may include a plurality of dense layers. In some non-limiting embodiments, the generator network may include a first dense layer comprising a plurality of nodes (e.g., an input layer comprising a plurality of input nodes). For example, the first dense layer (e.g., input layer) may include 182 nodes (e.g., corresponding to the first number of features, the same number of features of real account data, and/or the like). Additionally or alternatively, each node may include an activation function (e.g., ReLU function, sigmoid function, hyperbolic tangent function, and/or the like). For example, each node may have a ReLU function as the activation function thereof.

In some non-limiting embodiments, the discriminator network may include a second dense layer comprising a plurality of nodes (e.g., a first hidden layer comprising a plurality of nodes). For example, the second dense layer (e.g., first hidden layer) may include 128 nodes (e.g., $2^7$ nodes). Additionally or alternatively, each node may include an activation function (e.g., ReLU function, sigmoid function, hyperbolic tangent function, and/or the like). For example, each node may have a ReLU function as the activation function thereof. In some non-limiting embodiments, the second dense layer may be fully connected to the first dense layer.

In some non-limiting embodiments, the discriminator network may include a third dense layer comprising a plurality of nodes (e.g., a second hidden layer comprising a plurality of nodes). For example, the third dense layer (e.g., second hidden layer) may include 64 nodes (e.g., $2^6$ nodes). Additionally or alternatively, each node may include an activation function (e.g., ReLU function, sigmoid function, hyperbolic tangent function, and/or the like). For example, each node may have a ReLU function as the activation function thereof. In some non-limiting embodiments, the third dense layer may be fully connected to the second dense layer.

In some non-limiting embodiments, the discriminator network may include a fourth dense layer comprising a plurality of nodes (e.g., a third hidden layer comprising a plurality of nodes). For example, the fourth dense layer (e.g., third hidden layer) may include 32 nodes (e.g., $2^5$ nodes). Additionally or alternatively, each node may include an activation function (e.g., ReLU function, sigmoid function, hyperbolic tangent function, and/or the like). For example, each node may have a ReLU function as the activation function thereof. In some non-limiting embodiments, the fourth dense layer may be fully connected to the third dense layer.

In some non-limiting embodiments, the discriminator network may include a fifth dense layer comprising a plurality of nodes (e.g., a fourth hidden layer comprising a plurality of nodes). For example, the fifth dense layer (e.g., fourth hidden layer) may include 16 nodes (e.g., $2^4$ nodes). Additionally or alternatively, each node may include an activation function (e.g., ReLU function, sigmoid function, hyperbolic tangent function, and/or the like). For example, each node may have a ReLU function as the activation function thereof. In some non-limiting embodiments, the fifth dense layer may be fully connected to the fourth dense layer.

In some non-limiting embodiments, the discriminator network may include a sixth dense layer comprising at least one node (e.g., a first output layer comprising at least one node). For example, the sixth dense layer (e.g., first output layer) may include one node (e.g., corresponding to the first output and/or the like). Additionally or alternatively, the node may include an activation function (e.g., ReLU function, sigmoid function, hyperbolic tangent function, and/or the like). For example, the node may have a sigmoid function as the activation function thereof. In some non-limiting embodiments, the sixth dense layer may be fully connected to the fifth dense layer.

In some non-limiting embodiments, the discriminator network may include a seventh dense layer comprising at least one node (e.g., a second output layer comprising at least one node). For example, the seventh dense layer (e.g., second output layer) may include one node (e.g., corresponding to the second output and/or the like). Additionally or alternatively, the node may include an activation function (e.g., ReLU function, sigmoid function, hyperbolic tangent function, and/or the like). For example, the node may have a sigmoid function as the activation function thereof. In some non-limiting embodiments, the seventh dense layer may be fully connected to the fifth dense layer.

As shown in FIG. 3, at step 306, process 300 may include providing a second input to the discriminator network. For example, transaction service provider system 102 may provide a training dataset as a second input to the discriminator network. In some non-limiting embodiments, such (second) input may be provided (e.g., by transaction service provider system 102) to the discriminator network during a training procedure.

In some non-limiting embodiments, the training dataset may include a plurality of feature vectors, and each feature vector may include a set of values for a plurality of features that are included in the feature vector. In one example, a set of values for the plurality of features may include account data associated with an account that conducted a plurality of payment transactions involving a plurality of merchants. In some non-limiting embodiments, the plurality of features of each feature vector in the training dataset is the same or similar to the plurality of features of each feature vector in a generated dataset (e.g., a generated dataset that is generated using the generator network).

In some non-limiting embodiments, the second plurality of payment transactions may include real payment transactions. Additionally or alternatively, the plurality of features of the training dataset may include the first number of features. In some non-limiting embodiments, the discriminator network may include an input node for each feature of the first number of features (e.g., each feature of the training dataset).

In some non-limiting embodiments, at least one output of the discriminator network may be generated. For example, transaction service provider system 102 may generate at least one of a first output, a second output, any combination thereof, and/or the like of the discriminator network based on the input(s) (e.g., first input, second input, any combination thereof, and/or the like). In some non-limiting embodiments, the output(s) may include a first output having a (first) label that indicates whether a set of values of each of the plurality of features is a real set of values or a fake set of values. Additionally or alternatively, the output(s) may include a second output having a (second) label that indicates whether a selected account of the plurality of accounts is going to conduct a payment transaction (e.g., first payment transaction) with a selected merchant of the plurality of merchants.

In some non-limiting embodiments, the first output may include a single bit or Boolean value. For example, the first output (e.g., bit or Boolean value) may be 1 or "True," respectively, if the discriminator network determines (e.g., predicts) that the plurality of features is a real set of values, and 0 or "False" otherwise (or vice versa). In some non-limiting embodiments, the first output may include a categorical value. For example, the first output may be "Real" or "R" if the discriminator network determines (e.g., predicts) that the plurality of features is a real set of values, and "Fake" or "F" otherwise. In some non-limiting embodiments, the first output may include a numerical value associated with a probability (e.g., determined, predicted, and/or the like by the discriminator network) that the plurality of features is real (or a probability that the plurality of features is fake). For example, such numerical value may be a number between 0 and 1, between 0 and 100, and/or the like.

In some non-limiting embodiments, the second output may include a single bit or Boolean value. For example, the second output (e.g., bit or Boolean value) may be 1 or "True," respectively, if the discriminator network determines (e.g., predicts) that the selected account is going to conduct a payment transaction (e.g., first payment transaction) with the selected merchant, and 0 or "False" otherwise (or vice versa). In some non-limiting embodiments, the second output may include a categorical value. For example, the first output may be "Active," "Activation," or "A" if the discriminator network determines (e.g., predicts) that the selected account is going to conduct a payment transaction (e.g., first payment transaction) with the selected merchant, and "Non Active," "Non Activation," or "N" otherwise. In some non-limiting embodiments, the second output may include a numerical value associated with a probability (e.g., determined, predicted, and/or the like by the discriminator network) that the selected account is going to conduct a payment transaction (e.g., first payment transaction) with the selected merchant. For example, such numerical value may be a number between 0 and 1, between 0 and 100, and/or the like.

In some non-limiting embodiments, the plurality of features (e.g., of the generated dataset, the training dataset, and/or the like) may include the first number of features. Additionally or alternatively, the output(s) (e.g., first and second outputs and/or the like) of the discriminator network may include a third number of features (e.g., one feature for the first output, one feature for the second output, and/or the like). In some non-limiting embodiments, the generator network may include an input node for each feature of the first number of features (e.g., each feature of the generated dataset, the training dataset, and/or the like). Additionally or alternatively, the generator network may include an output node for each feature of the third number of features (e.g., each feature of the output(s) of the discriminator network).

As shown in FIG. 3, at step 308, process 300 may include updating the generator network. For example, transaction service provider system 102 may update the generator network based on a first output of the discriminator network and/or a (first) label that indicates whether a set of values of each of the plurality of features is a real set of values or a fake set of values. In some non-limiting embodiments, such updating may be performed (e.g., by transaction service provider system 102) during a training procedure.

In some non-limiting embodiments, transaction service provider system 102 may determine at least one (first) feedback value based on the first output and a label of the respective input (e.g., a label that indicates whether the plurality of features is actually a real set of values or a fake set of values). For example, the (first) feedback value may be an error value (e.g., a prediction error, a contrastive loss, and/or the like) based on the first output and the label. Additionally or alternatively, transaction service provider system 102 may update the generator network (e.g., update the weights thereof and/or the like) based on the feedback value(s) (e.g., using back propagation and/or the like).

In some non-limiting embodiments, during the training procedure, transaction service provider system 102 may implement a dropout of a portion of the nodes of at least one of the first dense layer, the second dense layer, the third dense layer, the fourth dense layer, the fifth dense layer, any combination thereof, and/or the like of the generator network. For example, transaction service provider system 102 may implement a dropout of 30% (e.g., of the nodes) at each of the first dense layer, the second dense layer, the third dense layer, the fourth dense layer, and the fifth dense layer of the generator network. In some non-limiting embodiments, a dropout may include randomly dropping out (e.g., ignoring, disabling, disconnecting, and/or the like) nodes during training (e.g., each training iteration and/or the like). For example, such a dropout may allow for regularization, reduction of overfitting, and improvement of generalization error and/or the like.

In some non-limiting embodiments, during the training procedure, transaction service provider system 102 may implement a batch normalization of at least one of the first dense layer, the second dense layer, the third dense layer, the fourth dense layer, the fifth dense layer, any combination thereof, and/or the like of the generator network. For example, transaction service provider system 102 may implement a batch normalization at each of the first dense layer, the second dense layer, the third dense layer, the fourth dense layer, and the fifth dense layer of the generator network. In some non-limiting embodiments, a batch normalization may include normalization of the input and/or output values of each node by adjusting and/or scaling the activations of each node.

As shown in FIG. 3, at step 310, process 300 may include updating the discriminator network. For example, transaction service provider system 102 may update the discriminator network based on a second output of the discriminator network and/or a (second) label that indicates whether a selected account of the plurality of accounts is going to conduct a first payment transaction with a selected merchant of the plurality of merchants. Additionally or alternatively, transaction service provider system 102 may update the discriminator network (further) based on the first output of the discriminator network and/or a (first) label that indicates whether a set of values of each of the plurality of features is a real set of values or a fake set of values. In some non-limiting embodiments, such updating may be performed (e.g., by transaction service provider system 102) during a training procedure.

In some non-limiting embodiments, transaction service provider system 102 may determine at least one (second) feedback value based on the second output and a label of the respective input (e.g., that indicates whether a selected account of the plurality of accounts is actually going to conduct a first payment transaction with a selected merchant of the plurality of merchants). For example, the (second) feedback value may be an error value (e.g., a prediction error, a contrastive loss, and/or the like) based on the second output and the label. Additionally or alternatively, transaction service provider system 102 may update the discriminator network (e.g., update the weights thereof and/or the like) based on the feedback value(s) (e.g., using back propagation and/or the like).

In some non-limiting embodiments, during the training procedure, transaction service provider system 102 may implement a dropout of a portion of the nodes of at least one of the first dense layer, the second dense layer, the third dense layer, the fourth dense layer, the fifth dense layer, any combination thereof, and/or the like of the discriminator network. For example, transaction service provider system 102 may implement a dropout of 30% (e.g., of the nodes) at each of the first dense layer, the second dense layer, the third dense layer, the fourth dense layer, and the fifth dense layer of the discriminator network. In some non-limiting embodiments, a dropout may include randomly dropping out (e.g., ignoring, disabling, disconnecting, and/or the like) nodes during training (e.g., each training iteration and/or the like). For example, such a dropout may allow for regularization, reduction of overfitting, and improvement of generalization error and/or the like.

In some non-limiting embodiments, during the training procedure, transaction service provider system 102 may implement a batch normalization of at least one of the first dense layer, the second dense layer, the third dense layer, the fourth dense layer, the fifth dense layer, any combination thereof, and/or the like of the discriminator network. For example, transaction service provider system 102 may implement a batch normalization at each of the first dense layer, the second dense layer, the third dense layer, the fourth dense layer, and the fifth dense layer of the discriminator network. In some non-limiting embodiments, a batch normalization may include normalization of the input and/or output values of each node by adjusting and/or scaling the activations thereof.

In some non-limiting embodiments, during the training procedure, the discriminator network of the GAN may be updated (e.g., optimized and/or the like) based on a formula (e.g., by transaction service provider system 102). For example, the formula may include a value of recall for the discriminator network. For the purpose of illustration, recall may be defined as follows:

$$\text{Recall} = TP/(TP+FN)$$

wherein TP may represent a number of true positive predictions based on an output of the discriminator corresponding to a label (e.g., ground truth label and/or the like) of a set of values of a plurality of features, and/or FN may represent a number of false negative predictions based on an output of the discriminator not corresponding to a label (e.g., ground truth label and/or the like) of a set of values of a plurality of features.

In some non-limiting embodiments, at least one further input may be provided to the discriminator network. For example, after the discriminator network is trained (e.g., after the training procedure), transaction service provider system 102 may provide at least one further input to the discriminator network. Additionally or alternatively, transaction service provider system 102 may obtain an output (e.g., from the discriminator network based on the further input) that indicates whether an account is going to conduct a first payment transaction with a merchant of the plurality of merchants.

In some non-limiting embodiments, transaction service provider system 102 may provide a training dataset as an input to a gradient boosting machine learning model (e.g., Extreme Gradient Boosting (XGBoost) model and/or the like), a collaborative filtering model (e.g., Neural Collaborative Filtering (NCF) model and/or the like), or any combination thereof. In some non-limiting embodiments, the training dataset may include a plurality of feature vectors and transaction service provider system 102 may determine a probability score for each feature vector of the training dataset using the gradient boosting machine learning model, the collaborative filtering model, or a combination thereof. In some non-limiting embodiments, the probability score is a score that indicates a probability that an account associated with a feature vector is going to conduct a first payment transaction with a merchant associated with that feature vector. Transaction service provider system 102 may initialize an output of the discriminator network to be equal to a highest probability score of the probability scores of the plurality of feature vectors. In some non-limiting embodiments, the highest probability score is based on a recall for the discriminator network. In some non-limiting embodiments, transaction service provider system 102 may optimize the discriminator network of the GAN using the highest probability score as the initial output of the discriminator network.

For the purpose of illustration, transaction service provider system 102 may provide the randomly generated data (e.g., the random vector and/or the like) as an input to an XGBoost machine learning model and an NCF machine learning model. In some non-limiting embodiments, an output of the machine learning model(s) may be provided (e.g., by transaction service provider system 102) as input to the generator network. For example, the output of at least one of a gradient boosting machine learning model (e.g., XGBoost model and/or the like), a neural collaborative filtering (NCF) model, or any combination thereof, may be provided as input to the generator network. For the purpose of illustration, transaction service provider system 102 may provide the output of the XGBoost machine learning model and a NCF machine learning model as the input to the generator network.

Referring now to FIGS. 4A-4D, FIGS. 4A-4D are diagrams of an implementation 400 of a process (e.g., process 300) for implementing a GAN to determine a merchant activation. One or more of the functions described with respect to the process may be performed (e.g., completely, partially, and/or the like) by transaction service provider system 102. In some non-limiting embodiments, one or more of the steps of the process may be performed (e.g., completely, partially, and/or the like) by another device or a group of devices separate from and/or including transaction service provider system 102 such as, for example, user device 104, merchant system 106, issuer system 108, and/or acquirer system 110.

As illustrated in FIGS. 4A-4D, implementation 400 may include generator network 400a and discriminator network 400b that are the components of a GAN. In some non-limiting embodiments, the model architecture of generator network 400a may include first dense layer 412, second dense layer 414, third dense layer 416, and fourth dense layer 418. In some non-limiting embodiments, generator network 400a may be the same or similar to a generator network as described herein. In some non-limiting embodiments, discriminator network 400b may include first dense layer 426, second dense layer 428, third dense layer 432, and fourth dense layer 434. In some non-limiting embodiments, discriminator network 400b may be the same or similar to a discriminator network, as described herein.

Figure 4A:
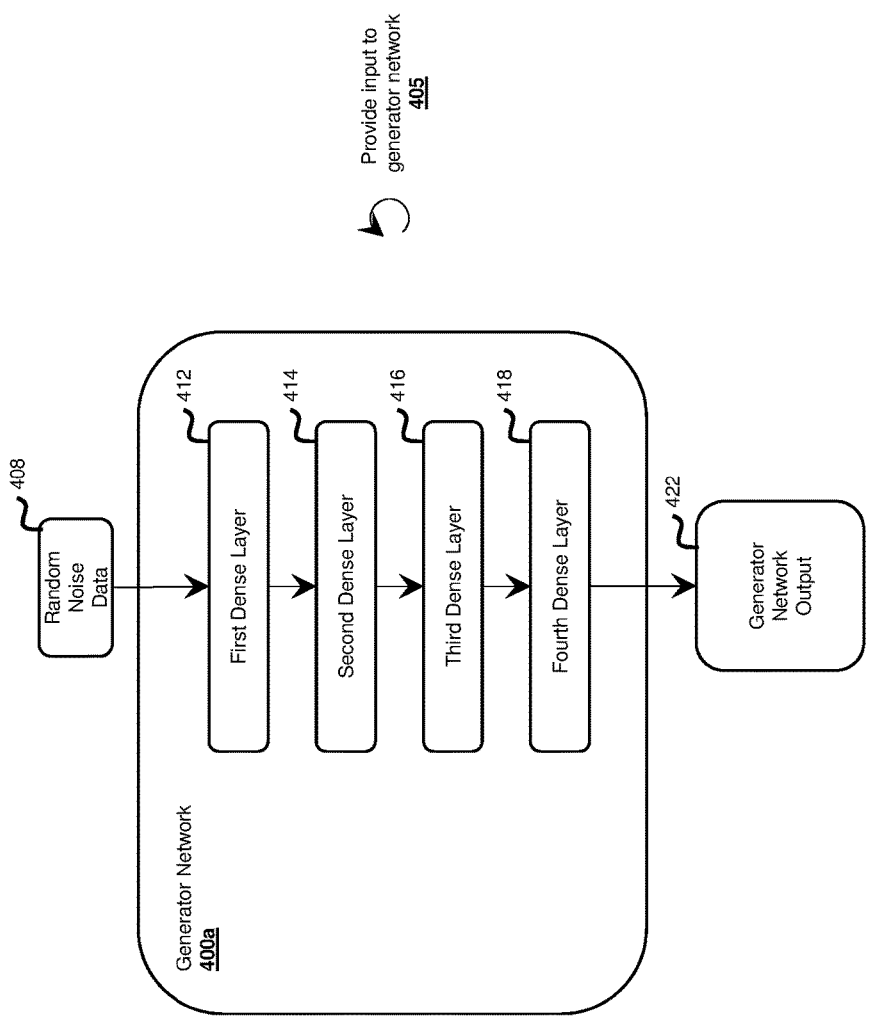
FIGS. 4A-4D are diagrams of a non-limiting embodiment of a machine learning model architecture for implementing a GAN to determine a merchant activation.

As shown by reference number 405 in FIG. 4A, transaction service provider system 102 may provide input to generator network 400a. For example, transaction service provider system 102 may provide random noise data 408 as the input to generator network 400a. In some non-limiting embodiments, generator network output 422 of generator network 400a may be based on random noise data 408. For example, transaction service provider system 102 may provide random noise data 408 as an input to first dense layer 412 of generator network 400a. In some non-limiting embodiments, an output of first dense layer 412 (e.g., an output of first dense layer 412 based on random noise data 408) may be provided as an input to second dense layer 414, an output of second dense layer 414 may be provided as an input to third dense layer 416, and an output of third dense layer 416 may be provided as an input to fourth dense layer 418. In some non-limiting embodiments, an output of fourth dense layer 418 may include generator network output 422.

In some non-limiting embodiments, generator network output 422 may include a plurality of feature vectors and each of the feature vectors represent a payment transaction conducted that involves an account of a customer. In some non-limiting embodiments, the plurality of feature vectors of generator network output 422 may be similar to a plurality of feature vectors included in training dataset 424. For example, the plurality of feature vectors of generator network output 422 may include values for a plurality of features, where the plurality of features are the same as the plurality of features of the plurality of feature vectors of training dataset 424. In some non-limiting embodiments, the values for the plurality of features in generator network output 422 are generated by transaction service provider system 102 using generator network 400a. In some non-limiting embodiments, the plurality of feature vectors in generator network output 422 are generated by transaction service provider system 102 using generator network 400a and are labeled by transaction service provider system 102 as having real values or fake values. For example, transaction service provider system 102 may generate the plurality of feature vectors in generator network output 422 using generator network 400a based on random noise data 408 and transaction service provider system 102 may label each feature vector as having a real set of values or a fake set of values.

Figure 4B:
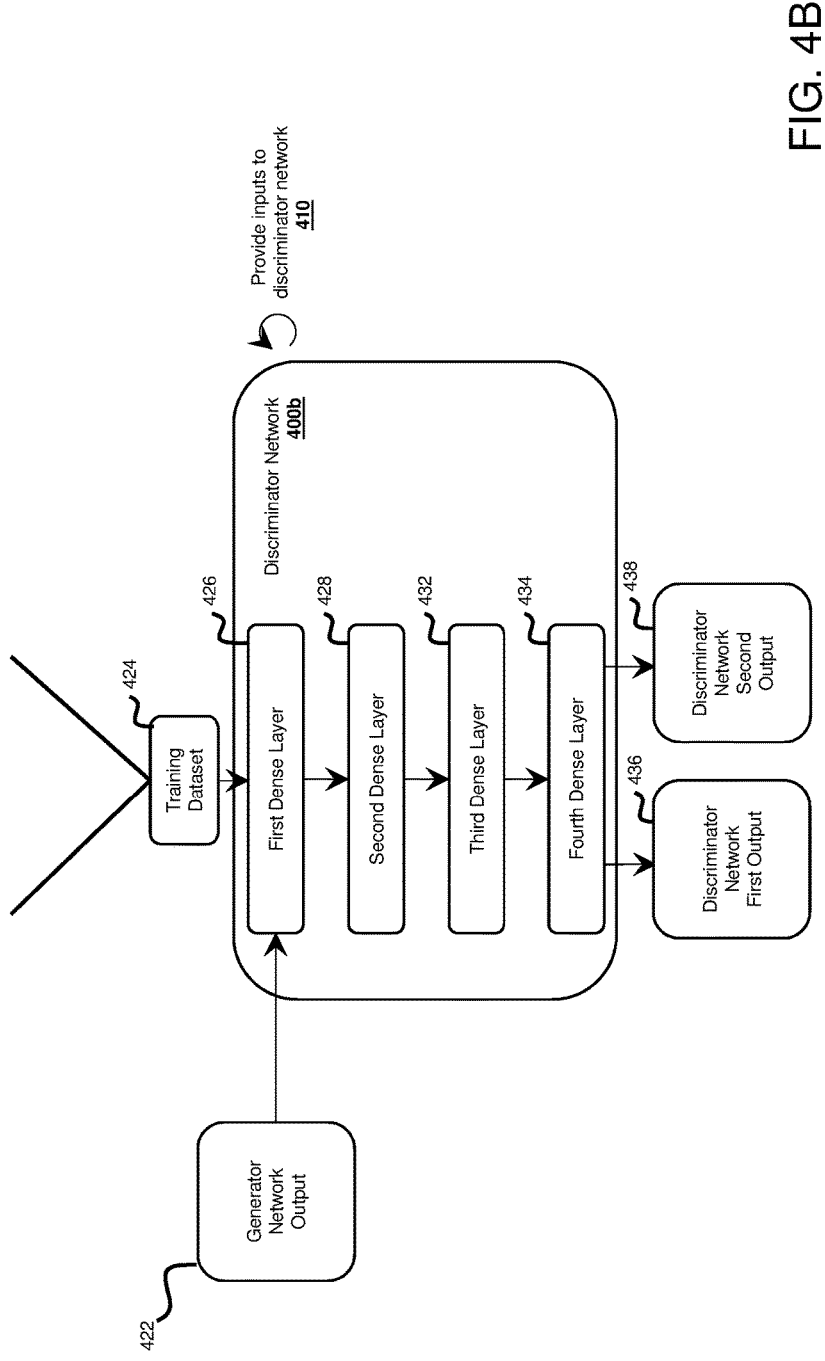

As shown by reference number 410 in FIG. 4B, transaction service provider system 102 may provide inputs to discriminator network 400b. For example, transaction service provider system 102 may provide generator network output 422 and training dataset 424 as inputs to discriminator network 400b. In some non-limiting embodiments, outputs (e.g., discriminator network first output 436 and discriminator network second output 438) of discriminator network 400b may be based on generator network output 422 and training dataset 424. For example, transaction service provider system 102 may provide generator network output 422 and training dataset 424 as an input to first dense layer 426 of discriminator network 400b. In some non-limiting embodiments, an output of first dense layer 426 (e.g., an output of first dense layer 412 based on random noise data 408) may be provided as an input to second dense layer 428, an output of second dense layer 428 may be provided as an input to third dense layer 432, and an output of third dense layer 432 may be provided as an input to fourth dense layer 434. In some non-limiting embodiments, an output of fourth dense layer 434 may include discriminator network first output 436 and discriminator network second output 438.

In some non-limiting embodiments, training dataset 424 may include a plurality of feature vectors and the plurality of feature vectors may each include a plurality of features. The values of the plurality of features may include account data associated with one or more accounts at an account level and/or a merchant level. The account data may include an account identifier, a merchant identifier, and/or a rating (e.g., account 123x may have a rating of "0" assigned to a merchant "A"; account 123x may have a rating of "1"

assigned to a merchant "B", account 123x may have a rating of "1" to a merchant "C", account 456x may have a rating of "0" to the merchant "A", and/or the like). The rating may include an indication of whether the account associated with a feature vector will have an activation with a merchant (e.g., a merchant activation) associated with a merchant identifier included in the feature vector within a time interval.

Additionally or alternatively, the account data may include data associated with one or more merchants. For example, account data may include account level data that may include a total transaction amount of an account in a merchant category code (MCC) during a time interval, a total transaction amount of an account involving a merchant during a time interval, and/or a total number of transactions conducted by an account involving a merchant during a time interval. Additionally or alternatively, account data may include merchant level data that may include a total transaction amount of all accounts in a dataset in an MCC during a time interval, a total transaction amount of all accounts in a dataset involving a merchant during a time interval, and/or a total number of transactions conducted by all accounts in a dataset involving a merchant during a time interval.

In some non-limiting embodiments, discriminator network first output 436 may include a plurality of feature vectors that have a label for each feature vector of the plurality of feature vectors. The label may indicate whether an account associated with (e.g., included in) that feature vector is going to conduct a first payment transaction with a merchant associated with (e.g., included in) that feature vector. In some non-limiting embodiments, the label may indicate whether the account associated with the feature vector is going to conduct a first payment transaction with the merchant associated with the feature vector within a time interval (e.g., a predetermined time interval, a predetermined time interval based on the model architecture of discriminator network 400b, a predetermined time interval based on the model architecture of generator network 400a, and/or the like). For example, the label may indicate whether the account is going to conduct a first payment transaction with the merchant within a six month time interval (e.g., a six month time interval from a date on which the label was generated). In some non-limiting embodiments, the labels for the plurality of feature vectors included in discriminator network first output 436 are generated by transaction service provider system 102 using discriminator network 400b and are generated by transaction service provider system 102. For example, transaction service provider system 102 may generate the labels for the plurality of feature vectors in discriminator network first output 436 using discriminator network 400b based on training dataset 424 and/or generator network output 422 and transaction service provider system 102 may label each feature vector to indicate whether the account associated with the feature vector is going to conduct a first payment transaction with the merchant associated with the feature vector within a time interval.

In some non-limiting embodiments, discriminator network second output 438 may include a plurality of feature vectors that have a label for each feature vector of the plurality of feature vectors. The label may indicate whether a set of values included in each feature vector is a real set of values or a fake set of values. In some non-limiting embodiments, the labels for the plurality of feature vectors included in discriminator network second output 438 are generated by transaction service provider system 102 using discriminator network 400b. For example, transaction service provider system 102 may generate the labels for the plurality of feature vectors in discriminator network second output 438 using discriminator network 400b based on training dataset 424 and/or generator network output 422 and transaction service provider system 102 may label each feature vector to indicate whether a set of values included in each feature vector is a real set of values or a fake set of values.

Figure 4C:
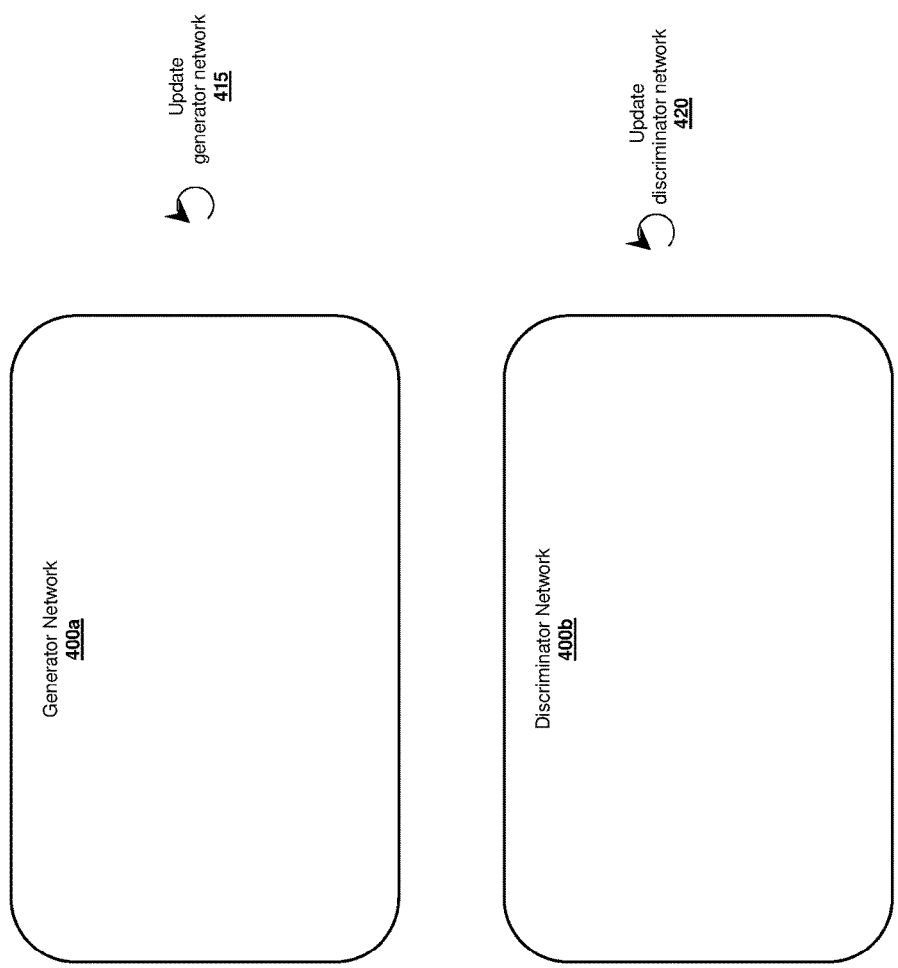

As shown by reference number 415 in FIG. 4C, transaction service provider system 102 may update generator network 400a. For example, transaction service provider system 102 may update generator network 400a based on discriminator network first output 436. For example, transaction service provider system 102 may update generator network 400a based on a plurality of feature vectors included in discriminator network first output 436 that each have a label that indicates whether a set of values included in each feature vector is a real set of values or a fake set of values. In some non-limiting embodiments, transaction service provider system 102 may update the weights and/or bias terms associated with one or more nodes of generator network 400a based on whether the plurality of feature vectors included in discriminator network first output 436 were correctly labeled as having a real set of values or a fake set of values.

As further shown by reference number 420 in FIG. 4C, transaction service provider system 102 may update discriminator network 400b. For example, transaction service provider system 102 may update discriminator network 400b based on discriminator network first output 436 and training dataset 424. In some non-limiting embodiments, transaction service provider system 102 may compare the labels of the plurality of feature vectors (e.g., a plurality of labels that indicate whether an account associated with a feature vector of the plurality of feature vectors is going to conduct a first payment transaction with a merchant associated with that feature vector) included in the discriminator network first output 436 to the labels of the plurality of feature vectors included in training dataset 424 and transaction service provider system 102 may determine whether the plurality of feature vectors included in the discriminator network first output 436 were labelled correctly. Transaction service provider system 102 may update discriminator network 400b based on determining that one or more feature vectors of the plurality of feature vectors included in discriminator network first output 436 were not labelled correctly.

Additionally or alternatively, transaction service provider system 102 may update discriminator network 400b based on discriminator network second output 438 and generator network output 422 and training dataset 424. For example, transaction service provider system 102 may compare the labels of the plurality of feature vectors (e.g., a plurality of labels that indicate whether each feature vector of the plurality of feature vectors includes a set of values that is a real set of values or a fake set of values) included in discriminator network second output 438 to the labels of the plurality of feature vectors included in generator network output 422 and the labels of the plurality of feature vectors included in training dataset 424 and transaction service provider system 102 may determine whether the plurality of feature vectors included in discriminator network second output 438 were labelled correctly. Transaction service provider system 102 may update discriminator network 400b based on determining that one or more feature vectors of the plurality of feature vectors included in discriminator network second output 438 were not labelled correctly.

Figure 4D:
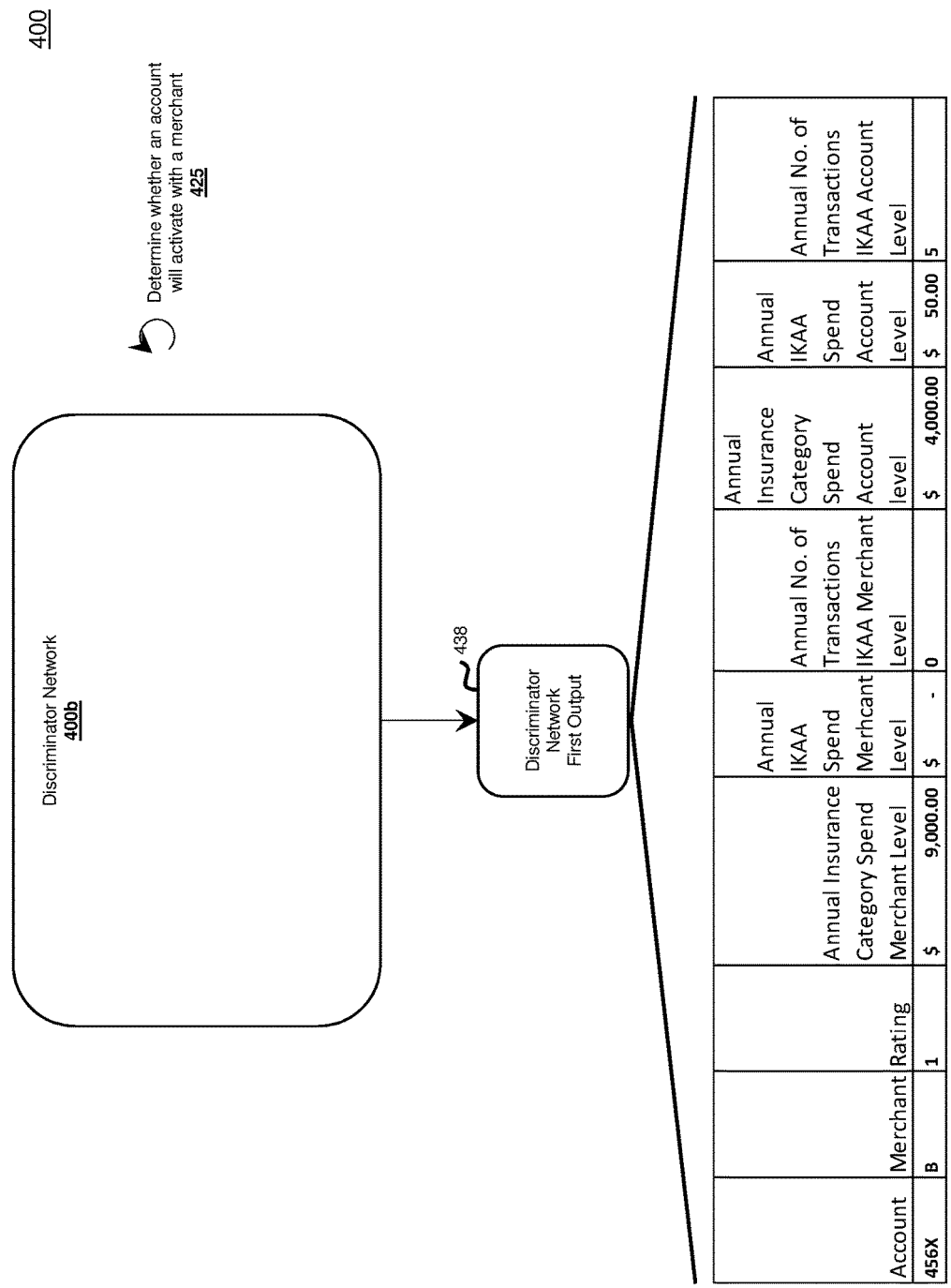

As shown by reference number 425 in FIG. 4D, transaction service provider system 102 may determine whether an account will have a merchant activation with a merchant. For example, transaction service provider system 102 may provide an input to discriminator network 400b after transaction service provider system 102 updated discriminator network 400b. In some non-limiting embodiments, the input may include a dataset that includes a feature vector with a set of values of a plurality of features. Transaction service provider system 102 may generate discriminator network first output 438 based on the input to discriminator network 400b. In some non-limiting embodiments, discriminator network first output 438 may include a label (e.g., a rating) that indicates whether an account associated with the feature vector is going to conduct a first payment transaction with a merchant associated with the feature vector within a time interval.

Although the above systems, methods, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method for generating a machine learning model to classify an account based on merchant activation comprising:
    providing, during a training procedure and with at least one processor, an input to a generator network of a generative adversarial network (GAN)), wherein providing, during the training procedure, the input to the generator network of the GAN comprises:
        providing randomly generated data as an input to an XGBoost machine learning model and a Neural Collaborative Filtering machine learning model; and
        providing an output of the XGBoost machine learning model and the Neural Collaborative Filtering machine learning model as the input to the generator network of the GAN;
    generating, with at least one processor, an output of the generator network based on the input to the generator network of the GAN, wherein the output comprises a generated dataset, wherein the generated dataset comprises a first plurality of sets of values for each of a plurality of features and the first plurality of sets of values for each of the plurality of features comprises data associated with a first plurality of payment transactions conducted using a plurality of accounts and involving a plurality of merchants, wherein the plurality of features of the training dataset is the same as the plurality of features of the generated dataset, and wherein the plurality of features comprises:
    a feature associated with a time interval of a payment transaction,
    a feature associated with a market segment of a merchant involved in a payment transaction,
    a feature associated with a transaction amount of a payment transaction,
    a feature associated with a total amount of a plurality of payment transactions conducted within a time interval, and
    a feature associated with a total amount of a plurality of card-present payment transactions conducted within a time interval;
    providing, during the training procedure and with at least one processor, the output of the generator network as an input to a discriminator network of the GAN;
    providing, during the training procedure and with at least one processor, a training dataset as an input to the discriminator network of the GAN, wherein the training dataset comprises a second plurality of sets of values for each of the plurality of features and the second plurality of sets of values for each of the plurality of features comprises data associated with a second plurality of payment transactions conducted using the plurality of accounts and involving the plurality of merchants;
    updating, during the training procedure and with at least one processor, the generator network of the GAN based on a first output of the discriminator network of the GAN having a label that indicates whether a set of values of each of the plurality of features is a real set of values or a fake set of values; and
    updating, during the training procedure and with at least one processor, the discriminator network of the GAN based on a second output of the discriminator network of the GAN having a label that indicates whether a selected account of the plurality of accounts is going to conduct a first payment transaction with a selected merchant of the plurality of merchants.

2. The computer-implemented method of claim 1, wherein the generator network of the GAN comprises:
    a first dense layer comprising a rectified linear unit (ReLu) function with 16 nodes;
    a second dense layer comprising a ReLu function with 32 nodes, wherein the second dense layer is fully connected to the first dense layer;
    a third dense layer comprising a ReLu function with 64 nodes, wherein the third dense layer is fully connected to the second dense layer;
    a fourth dense layer comprising a ReLu function with 128 nodes, wherein the fourth dense layer is fully connected to the third dense layer; and
    a fifth dense layer comprising a ReLu function with 182 nodes, wherein the fifth dense layer is fully connected to the fourth dense layer.

3. The computer-implemented method of claim 2, further comprising:
    during the training procedure, implementing a dropout of 30% at each of the first dense layer, the second dense layer, the third dense layer, the fourth dense layer, and the fifth dense layer of the generator network of the GAN; and
    during the training procedure, implementing a batch normalization process at each of the first dense layer, the second dense layer, the third dense layer, the fourth dense layer, and the fifth dense layer of the generator network of the GAN.

4. The computer-implemented method of claim 1, wherein the discriminator network of the GAN comprises:
    a first dense layer comprising a ReLu function with 128 nodes;
    a second dense layer comprising a ReLu function with 64 nodes, wherein the second dense layer is fully connected to the first dense layer;
    a third dense layer comprising a ReLu function with 32 nodes, wherein the third dense layer is fully connected to the second dense layer;

a fourth dense layer comprising a ReLu function with 16 nodes, wherein the fourth dense layer is fully connected to the third dense layer;

a fifth dense layer comprising a sigmoid function with 1 node, wherein the fifth dense layer is fully connected to the fourth dense layer; and a sixth dense layer comprising a sigmoid function with 1 node, wherein the sixth dense layer is fully connected to the fourth dense layer.

5. The computer-implemented method of claim 4, further comprising:

during the training procedure, implementing a dropout of 30% at each of the first dense layer, the second dense layer, the third dense layer, and the fourth dense layer of the discriminator network of the GAN; and during the training procedure, implementing a batch normalization process at each of the first dense layer, the second dense layer, the third dense layer, and the fourth dense layer of the discriminator network of the GAN.

6. The computer-implemented method of claim 1, further comprising:

providing an input to the discriminator network of the GAN and obtaining an output that indicates whether an account is going to conduct a first payment transaction with a merchant of the plurality of merchants.

7. The computer-implemented method of claim 1, wherein providing, during the training procedure, the input to the generator network of the GAN comprises:

providing randomly generated data as an input to an XGBoost machine learning model and a Neural Collaborative Filtering machine learning model; and providing an output of the XGBoost machine learning model and the Neural Collaborative Filtering machine learning model as the input to the generator network of the GAN.

8. The computer-implemented method of claim 1, further comprising:

during the training procedure, optimizing the discriminator network of the GAN based on a formula, wherein the formula includes a value of Recall for the discriminator network and the formula is defined as:

Recall=TP/(TP+FN);

wherein TP is a number of true positive predictions based on an output of the discriminator network corresponding to a ground truth label of a set of values of a plurality of features; and wherein FN is a number of false negative predictions based on an output of the discriminator network not corresponding to a ground truth label of a set of values of a plurality of features.

9. A system for generating a machine learning model to classify an account based on merchant activation, comprising:

at least one processor programmed or configured to:

provide, during a training procedure, an input to a generator network of a generative adversarial network (GAN), wherein, when providing, during the training procedure, the input to the generator network of the GAN, the at least one processor is programmed or configured to:

provide randomly generated data as an input to an XGBoost machine learning model and a Neural Collaborative Filtering machine learning model; and provide an output of the XGBoost machine learning model and the Neural Collaborative Filtering machine learning model as the input to the generator network of the GAN;

generate an output of the generator network based on the input to the generator network of the GAN, wherein the output comprises a generated dataset, wherein the generated dataset comprises a first plurality of sets of values for each of a plurality of features and the first plurality of sets of values for each of the plurality of features comprises data associated with a first plurality of payment transactions conducted using a plurality of accounts and involving a plurality of merchants;

provide, during the training procedure, the output of the generator network as an input to a discriminator network of the GAN;

provide, during the training procedure, a training dataset as an input to the discriminator network of the GAN, wherein the training dataset comprises a second plurality of sets of values for each of the plurality of features and the second plurality of sets of values for each of the plurality of features comprises data associated with a second plurality of payment transactions conducted using the plurality of accounts and involving the plurality of merchants, wherein the plurality of features of the training dataset is the same as the plurality of features of the generated dataset, and wherein the plurality of features comprises:

a feature associated with a time interval of a payment transaction, a feature associated with a market segment of a merchant involved in a payment transaction, a feature associated with a transaction amount of a payment transaction, a feature associated with a total amount of a plurality of payment transactions conducted within a time interval, and a feature associated with a total amount of a plurality of card-present payment transactions conducted within a time interval;

update, during the training procedure, the generator network of the GAN based on a first output of the discriminator network of the GAN having a label that indicates whether a set of values of each of the plurality of features is a real set of values or a fake set of values; and update, during the training procedure, the discriminator network of the GAN based on a second output of the discriminator network of the GAN having a label that indicates whether a selected account of the plurality of accounts is going to conduct a first payment transaction with a selected merchant of the plurality of merchants.

10. The system of claim 9, wherein the at least one processor is further programmed or configured to:

during the training procedure, implement a dropout of 30% at each of the first dense layer, the second dense layer, the third dense layer, the fourth dense layer, and the fifth dense layer of the generator network of the GAN; and during the training procedure, implement a batch normalization process at each of the first dense layer, the second dense layer, the third dense layer, the fourth dense layer, and the fifth dense layer of the generator network of the GAN.

11. The system of claim 9, wherein the discriminator network of the GAN comprises:
- a first dense layer comprising a ReLu function with 128 nodes;
- a second dense layer comprising a ReLu function with 64 nodes, wherein the second dense layer is fully connected to the first dense layer;
- a third dense layer comprising a ReLu function with 32 nodes, wherein the third dense layer is fully connected to the second dense layer;
- a fourth dense layer comprising a ReLu function with 16 nodes, wherein the fourth dense layer is fully connected to the third dense layer;
- a fifth dense layer comprising a sigmoid function with 1 node, wherein the fifth dense layer is fully connected to the fourth dense layer; and
- a sixth dense layer comprising a sigmoid function with 1 node, wherein the sixth dense layer is fully connected to the fourth dense layer.

12. The system of claim 11, wherein the at least one processor is programmed or configured to:
- during the training procedure, implement a dropout of 30% at each of the first dense layer, the second dense layer, the third dense layer, and the fourth dense layer of the discriminator network of the GAN; and
- during the training procedure, implement a batch normalization process at each of the first dense layer, the second dense layer, the third dense layer, and the fourth dense layer of the discriminator network of the GAN.

13. The system of claim 9, wherein the at least one processor is further programmed or configured to:
- provide an input to the discriminator network of the GAN and obtain an output that indicates whether an account is going to conduct a first payment transaction with a merchant of the plurality of merchants.

14. The system of claim 9, wherein when providing, during the training procedure, the input to the generator network of the GAN, the at least one processor is programmed or configured to:
- provide randomly generated data as an input to an XGBoost machine learning model and a Neural Collaborative Filtering machine learning model; and
- provide an output of the XGBoost machine learning model and the Neural Collaborative Filtering machine learning model as the input to the generator network of the GAN.

15. The system of claim 9, wherein the at least one processor is further programmed or configured to:
- during the training procedure, optimize the discriminator network of the GAN based on a formula, wherein the formula includes a value of Recall for the discriminator network and the formula is defined as:

$$Recall = TP/(TP+FN);$$

wherein TP is a number of true positive predictions based on an output of the discriminator network corresponding to a ground truth label of a set of values of a plurality of features; and wherein FN is a number of false negative predictions based on an output of the discriminator network not corresponding to a ground truth label of a set of values of a plurality of features.

16. A computer program product for generating a machine learning model to classify an account based on merchant activation comprising at least one non-transitory computer-readable medium including one or more instructions that, when executed by at least one processor, cause the at least one processor to:
- provide, during a training procedure, an input to a generator network of a generative adversarial network (GAN), wherein, the one or more instructions that cause the at least one processor to provide, during the training procedure, the input to the generator network of the GAN, cause the at least one processor to:
  - provide randomly generated data as an input to an XGBoost machine learning model and a Neural Collaborative Filtering machine learning model; and
  - provide an output of the XGBoost machine learning model and the Neural Collaborative Filtering machine learning model as the input to the generator network of the GAN;
- generate an output of the generator network based on the input to the generator network of the GAN, wherein the output comprises a generated dataset, wherein the generated dataset comprises a first plurality of sets of values for each of a plurality of features and the first plurality of sets of values for each of the plurality of features comprises data associated with a first plurality of payment transactions conducted using a plurality of accounts and involving a plurality of merchants;
- provide, during the training procedure, the output of the generator network as an input to a discriminator network of the GAN;
- provide, during the training procedure, a training dataset as an input to the discriminator network of the GAN, wherein the training dataset comprises a second plurality of sets of values for each of the plurality of features and the second plurality of sets of values for each of the plurality of features comprises data associated with a second plurality of payment transactions conducted using the plurality of accounts and involving the plurality of merchants, wherein the plurality of features of the training dataset is the same as the plurality of features of the generated dataset, and wherein the plurality of features comprises:
  - a feature associated with a time interval of a payment transaction,
  - a feature associated with a market segment of a merchant involved in a payment transaction,
  - a feature associated with a transaction amount of a payment transaction,
  - a feature associated with a total amount of a plurality of payment transactions conducted within a time interval, and
  - a feature associated with a total amount of a plurality of card-present payment transactions conducted within a time interval;
- update, during the training procedure, the generator network of the GAN based on a first output of the discriminator network of the GAN having a label that indicates whether a set of values of each of the plurality of features is real set of values or a fake set of values; and
- update, during the training procedure, the discriminator network of the GAN based on a second output of the discriminator network of the GAN having a label that indicates whether a selected account of the plurality of accounts is going to conduct a first payment transaction with a selected merchant of the plurality of merchants.

17. The computer program product of claim 16, wherein the discriminator network of the GAN comprises:

a first dense layer comprising a rectified linear unit (ReLu) function with 128 nodes;

a second dense layer comprising a ReLu function with 64 nodes, wherein the second dense layer is fully connected to the first dense layer;

a third dense layer comprising a ReLu function with 32 nodes, wherein the third dense layer is fully connected to the second dense layer;

a fourth dense layer comprising a ReLu function with 16 nodes, wherein the fourth dense layer is fully connected to the third dense layer;

a fifth dense layer comprising a sigmoid function with 1 node, wherein the fifth dense layer is fully connected to the fourth dense layer; and a sixth dense layer comprising a sigmoid function with 1 node, wherein the sixth dense layer is fully connected to the fourth dense layer.

18. The computer program product of claim 17, wherein the one or more instructions further cause the at least one processor to:

during the training procedure, implement a dropout of 30% at each of the first dense layer, the second dense layer, the third dense layer, and the fourth dense layer of the discriminator network of the GAN; and during the training procedure, implement a batch normalization process at each of the first dense layer, the second dense layer, the third dense layer, and the fourth dense layer of the discriminator network of the GAN.

19. The computer program product of claim 16, wherein the one or more instructions further cause the at least one processor to:

provide an input to the discriminator network of the GAN and obtain an output that indicates whether an account is going to conduct a first payment transaction with a merchant of the plurality of merchants.

20. The computer program product of claim 16, wherein one or more instructions further cause the at least one processor to:

during the training procedure, optimize the discriminator network of the GAN based on a formula, wherein the formula includes a value of Recall for the discriminator network and the formula is defined as:

$$Recall=TP/(TP+FN);$$

wherein TP is a number of true positive predictions based on an output of the discriminator network corresponding to a ground truth label of a set of values of a plurality of features; and wherein FN is a number of false negative predictions based on an output of the discriminator network not corresponding to a ground truth label of a set of values of a plurality of features.

\* \* \* \* \*